April 18, 1967  J. GRILLO  3,315,148
A.-C. GENERATOR POWER SUPPLY
Filed Oct. 31, 1963  3 Sheets-Sheet 1

JOSEPH GRILLO
INVENTOR.

BY S. A. Giarratana
Francis L. Masselle
ATTORNEYS

JOSEPH GRILLO
INVENTOR.

April 18, 1967  J. GRILLO  3,315,148
A.-C. GENERATOR POWER SUPPLY
Filed Oct. 31, 1963  3 Sheets-Sheet 3

JOSEPH GRILLO
INVENTOR.

BY S. A. Giarratana
Francis L. Masselle
ATTORNEYS

United States Patent Office 3,315,148
Patented Apr. 18, 1967

3,315,148
A.-C. GENERATOR POWER SUPPLY
Joseph Grillo, New Milford, N.J., assignor to General Precision Inc., Little Falls, N.J., a corporation of Delaware
Filed Oct. 31, 1963, Ser. No. 320,278
9 Claims. (Cl. 322—4)

This invention relates generally to power supply systems and particularly to uninterrupted power supplies for electronic computers.

The problem of providing a suitable power supply for modern computers and electronic data processing equipment is unique in that transients and interruptions in the supply, which are generally harmless to most other electrical apparatus, have deleterious effects on computers, causing attributed errors and actual equipment damage. The problem has been solved in large measure by introducing a rotating machine between the power line source and the computer; this virtually eliminates transients and momentary power interruption.

Another aspect of the problem relates to complete power interruptions. At this juncture it would be well to distinguish between transients, disturbances, and momentary interruptions on one hand and complete interruptions on the other. The former are due to faults in the power system. Sometimes a fault causes transient disturbances lasting in the order of 3 to 9 cycles, which is the time necessary for circuit breakers to pick up and operate. Other types of faults cause disturbances which may last for as long as 30 cycles. Consequently, if the uninterrupted power supply system provided for the computer can wash out transients lasting for as long as one second, this will provide sufficient safety margin; interruptions persisting beyond one second are treated as complete interruptions requiring a shutdown of the computer.

The nature of many computers is such that they must be energized and de-energized gradually in order to avoid damage and/or loss of stored data. In some cases motor-driven devices such as variable autotransformers (Powerstats or Variacs) are utilized in the excitation circuits of the computers in order to achieve a gradual and controlled voltage build-up or decay. In one typical computer, the energizing cycle ("cycling on" as it is called) requires 16 seconds; when the computer is turned off, the voltages on all circuits are brought down to zero simultaneously in a period of 16 seconds. This is referred to as "cycling down."

Obviously, power is required to cycle down a computer and when there is a total interruption in the power supply the computer "crashes down." In a crash-down the various voltages decay at random in accordance with the energy storage characteristics of the individual power supplies from which they are drawn. It is of course quite possible to damage semiconductor components in a computer crash-down or at least it is likely that loss of stored data will result.

In order to supply power for cycling down computers in the event of a complete line power interruption, it is conventional to use motor-generator sets having a flywheel, the set serving to wash out voltage transients and the flywheel acting to store energy to cope with complete power interruptions. In this type of application such motor-generator units are known, and upon occasion may hereinafter be referred to, as "isolation sets" with allusion to their function of isolating the load from the primary power supply, i.e. the power lines. In order to store sufficient energy to provide power for the cycling down of the computer in case of complete power interruption, the flywheel must have a relatively large moment of inertia which has certain disadvantages and creates an entirely new problem as outlined below.

Consider, for example, the particular case of an isolation set consisting of a synchronous reluctance motor driving a synchronous generator. A set of this type is always started with no load on the generator. In order to accelerate a flywheel of the requisite moment of inertia from a standstill to operating speed would require a motor several times the size necessary without the flywheel. Moreover, the acceleration of the large inertial load would cause the drive motor to draw a high surge current for a relatively long period thus causing disturbances to other equipment connected to the same input power line.

It is, therefore, the fundamental object of the present invention to provide a power supply system which overcomes or mitigates at least one of the problems of the prior art as outlined above.

A more specific object is the provision of a power supply system including a motor-generator set and high-inertia flywheel which does not require an overly large motor for accelerating the flywheel.

Another object is the provision of an uninterrupted power supply for computers which provides power for a sufficient time after complete line power interruption to permit normal cycling down of the computer.

A further object of the invention is the provision of an uninterrupted power supply including a motor-generator set and high inertia flywheel which permits normal starting of the set without the flywheel load so as to provide acceleration without high current draw by the drive motor.

To the accomplishment of these and other objects, the present invention contemplates a power supply system which includes a motor-generator set, a flywheel, and electromagnetic clutch for coupling the flywheel to the motor-generator set. The clutch has an excitation circuit and a torque-transmission capability proportional to applied excitation. A control circuit is provided for regulating the excitation of the clutch, the control circuit comprising means operative to totally de-energize the clutch at rotational speeds of the motor-generator set below normal operating speed; means, operative upon the attainment of operating speed by the motor-generator set, to supply a fixed excitation to the clutch sufficient to produce gradual acceleration of the flywheel at a preselected rate up to a predetermined speed below the normal operating speed of the motor-generator set; and means, effective upon the attainment of the predetermined speed, to progressively increase the excitation of the clutch in accordance with increasing flywheel speed until locking of the clutch occurs. As used herein, the term "locking" refers to the condition in which the slippage of the clutch is actually or substantially zero or, stated conversely, the driving and driven elements of the clutch are rotating at the same speed.

Further objects of the invention, its advantages, scope and the manner in which it may be practiced will be more readily apparent to persons conversant with the art from a reading of the following description of an exemplary embodiment thereof taken in conjunction with the subjoined claims and annexed drawing in which:

Figure 1:
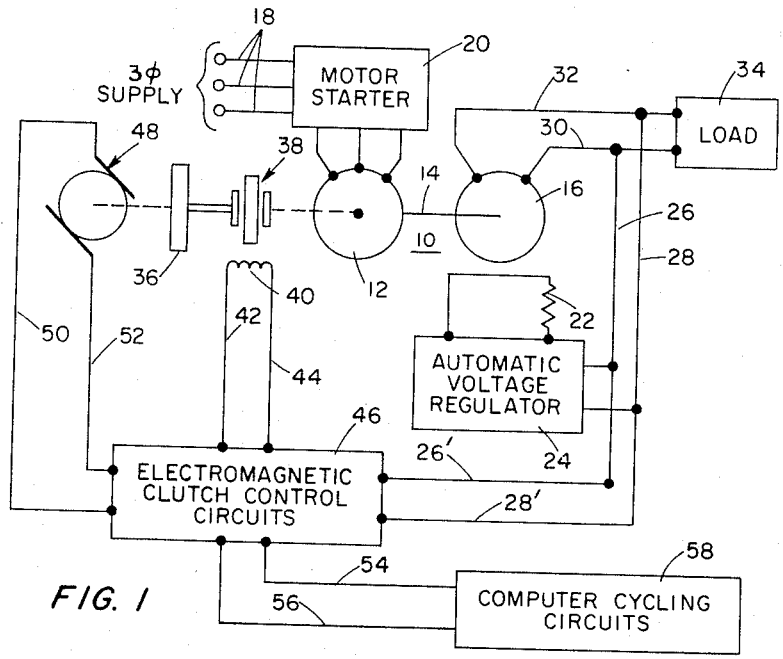
FIGURE 1 is a block diagram of a power supply system in accordance with the present invention.

Referring now to the drawings and first particularly to FIGURE 1, the power supply system contemplated by the present invention includes a motor-generator set 10 consisting of a drive motor 12 coupled by means of drive shaft 14 to drive a generator 16. In the particular embodiment selected for illustration and description by way of example, motor 12 is a synchronous reluctance motor, a particular type of induction motor which requires no field excitation. It is adapted to operate from a three-phase, 60-cycle, power line supply to which it is connected by way of suitable motor starting circuits 20.

Generator 16 is a single-phase synchronous alternator having its field windings 22 energized under the control of an automatic voltage regulator 24 connected as by lines 26, 28 to the output circuit 30, 32 of the generator 16. The automatic voltage regulator controls the excitation of generator field 22 so as to maintain the output voltage constant. A load 34, e.g., a computer, is connected across the output circuit of the generator.

A high inertia flywheel 36 is coupled to motor 12 by means of an electromagnetic clutch 38 having an energizing coil 40 connected by conductors 42, 44 to electromagnetic clutch control circuits 46 hereinafter described with particularity. Drivingly connected to the flywheel is and A.C. tachometer generator 48 the output of which is fed via conductors 50, 52 to clutch control circuits 46.

The clutch control circuits are energized from the output of generator 16 by way of conductors 26, 26' and 28, 28' and the clutch control circuits are connected via conductors 54, 56 to activate computer cycling circuits 58 for cycling down the computer in the event of power failure.

Electromagnetic clutch control circuits 46 include means, hereinafter described, to totally de-energize the clutch at rotational speeds of motor-generator set 10 below normal operating speed. Thus, when motor 12 is energized through motor starter 20, set 10 accelerates to normal operating speed with flywheel 36 decoupled.

Clutch control circuits 46 also contain means, hereinafter described, operative upon the attainment of operating speed to supply a fixed excitation to electromagnetic clutch 38 so as to produce a gradual acceleration of flywheel 36 at a preselected rate and up to a predetermined speed below the normal operating speed of motor-generator set 10. The clutch control circuits also comprise means which become effective upon the attainment of the aforementioned predetermined speed to progressively increase the excitation of the clutch with increasing flywheel speed until locking of the clutch occurs.

Figure 2:
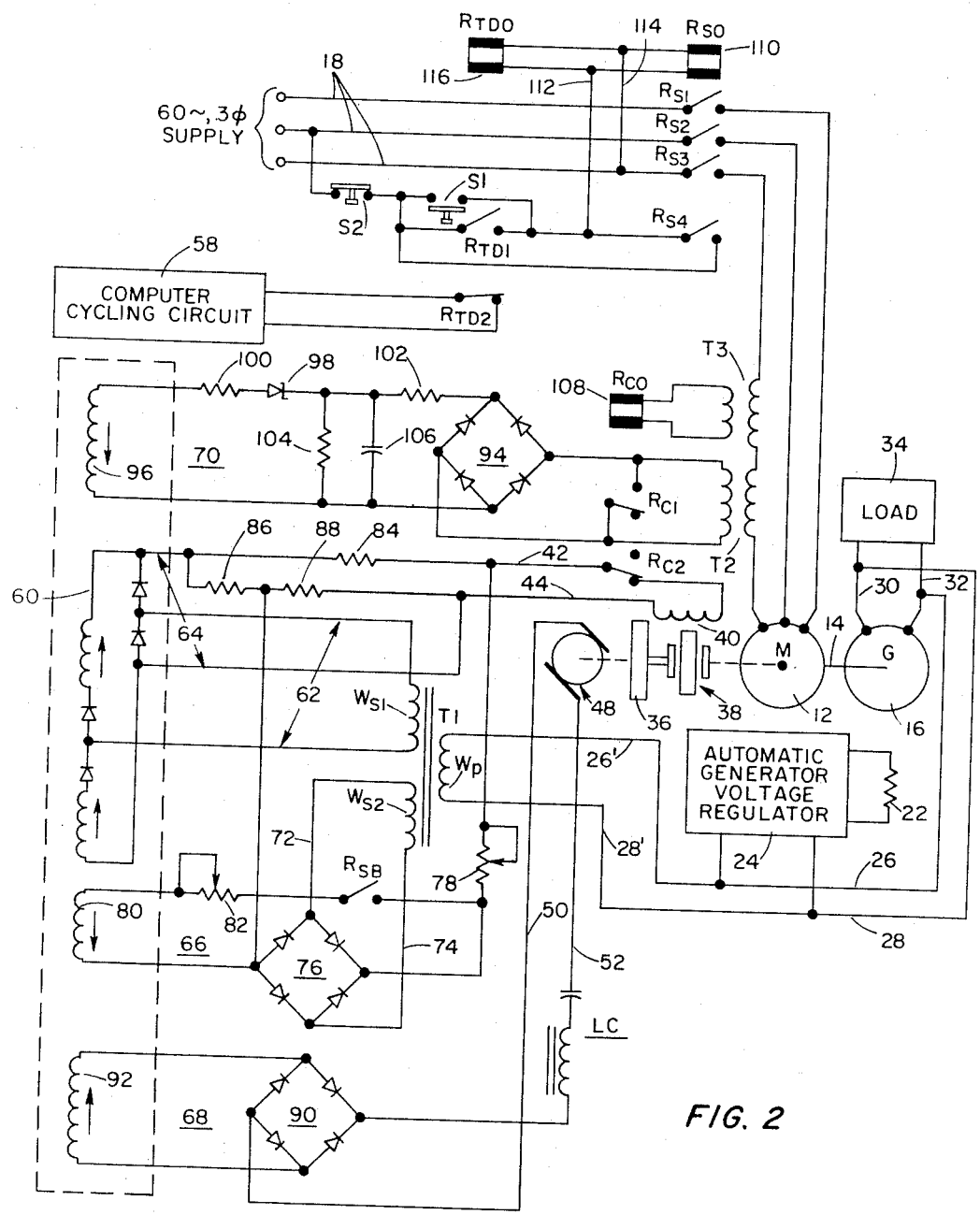
FIGURE 2 is a schematic circuit diagram of a particular exemplary power supply system embodying the invention.

In FIGURE 2 there is illustrated schematically a complete exemplary embodiment of a power supply system such as generalized in FIGURE 1. To facilitate correlation between FIGURES 1 and 2 a consistent system of reference numeral designation is utilized. The control circuits for electromagnetic clutch 38 comprise, as a basic component, a magnetic amplifier 60 of the single phase, full wave, bridge circuit type having an input 62 and output 64, a bias circuit 66, a control circuit 68 and a current limiting circuit 70.

Power is supplied to the magnetic amplifier by means of a power transformer $T_1$ which couples it to the output of A.C. generator 16. Thus, transformer $T_1$ has a primary winding $W_P$ connected via 26, 26' and 28, 28' across the output 30, 32 of generator 16 and a secondary winding $W_{S1}$ connected across the input 62 of magnetic amplifier 60. An additional secondary winding $W_{S2}$ of power transformer $T_1$ is connected via conductors 72, 74 across the input terminals of a bridge-type rectifier network 76 the output terminals of which are connected via conductors 42, 44 across clutch control coil 40. An adjustable resistor 78 in series with the output of rectifier bridge 76 permits adjustments of the current flowing to clutch coil 40.

The output terminals of rectifier bridge network 76 are also connected across bias circuit 66 of the magnetic amplifier which circuit includes a bias coil 80, an adjustable bias resistor 82 and a normally open contact $R_{SB}$ operated by a starting contactor $R_{SO}$.

The output lines 64 of the magnetic amplifier are also connected across clutch coil 40 via conductors 42, 44. A resistor network comprising resistors 84, 86, 88 constitute three legs of a bridge, the fourth leg of which is clutch coil 40. The output of the magnetic amplifier 60 is applied to one diagonal of the bridge and the output of rectifier 76 is applied to the other pair of bridge terminals. Thus, it will be seen that, while circuit isolation is achieved, clutch coil 40 can be energized by either or both the output of magnetic amplifier 60 and the output of the bridge rectifier network 76.

A second rectifier bridge network 90 has its input terminals connected across the output of tachometer generator 48 by conductors 50, 52. The output of bridge rectifier network 90 is applied to the ends of control coil 92 on the magnetic amplifier, the coil being wound with a polarity to increase the output of the amplifier with increased current flow and opposite to that of the bias coil 80. In series with the input circuit of the bridge rectifier 90 is a series resonant inductor-capacitor combination LC having a resonant frequency substantially corresponding to the output freqency of tachometer 48 at or near the operating speed of motor-generator set 10. Consequently, the impedance of inductor-capacitor combination LC is a minimum at substantially the synchronous speed of the drive motor and, concomitantly, the input to rectifier bridge network 90 is a maximum; under these conditions the rectified D.C. flowing control coil 92 is a maximum increasing the output of the magnetic amplifier and, therefore, the energization of clutch coil 40.

Current-limiting circuit 70 of magnetic amplifier 60 is connected across the output of a third bridge-type rectifier network 94 the input of which is inductively coupled, as by means of a current transformer $T_2$, to the power supply lines 18 of drive motor 12. Current-limiting circuit 70 includes, in series with a current-limiting control coil 96 which has the same polarity as bias coil 80, a Zener diode 98 interposed between a pair of series resistors 100, 102. A shunt resistor 104 and capacitor 106 are connected in parallel across the output of rectifier bridge 94.

A relay $R_{C0}$ has its operating coil 108 inductively coupled as by current transformer $T_3$ to the input power supply line 18 of drive motor 12 and has a first normally-open contact $R_{C1}$ shunting the input of rectifier bridge 94 and a second normally-closed contact $R_{C2}$ in series with clutch coil 40.

Starting contactor $R_{SO}$ has its operating coil 110 connected by lines 112, 114 across the input power supply to drive motor 12 and has respectively, normally-open contacts $R_{S1}$, $R_{S2}$, $R_{S3}$ in series with each of the supply lines 18 of the drive motor. In series with operating coil 110 are a normally-open "start" switch $S_1$ and a normally-closed "stop" switch $S_2$. Switch $S_1$ is shunted by a normally-open contact $R_{S4}$ on relay $R_{SO}$.

A fast-pickup, time-delayed-dropout relay $R_{TD0}$ has its operating coil 116 connected in parallel with coil 110 across the input supply to drive motor 12 and has a normally-open contact $R_{TD1}$ shunting starting switch $S_1$. A second normally-open contact $R_{TD2}$ of relay $R_{TD0}$ is disposed in circuit with computer cycling circuits 58.

Figure 3:
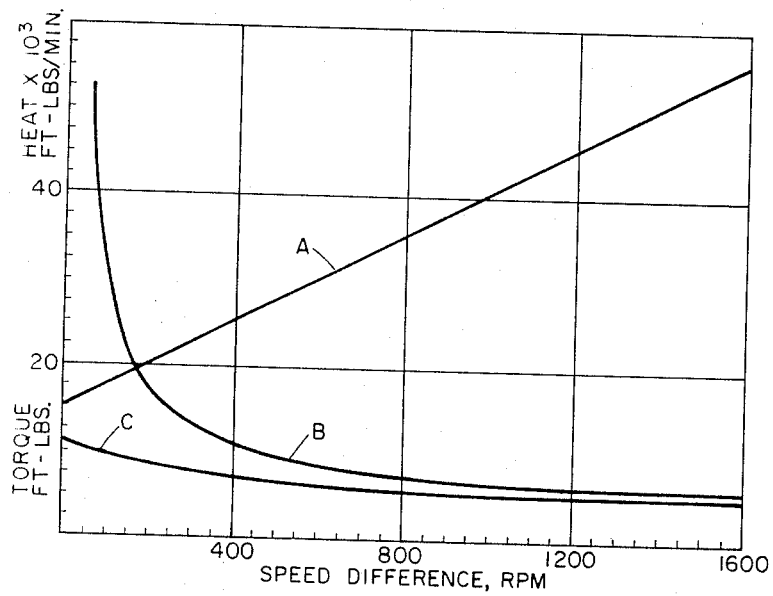
FIGURE 3 is a graphic representation of operating characteristics of an electromagnetic clutch utilized in the power supply systems of FIGURES 1 and 2.

Before presenting a detailed description of the over-all circuit operation, the operating characteristics of certain key components will be explained. In this connection reference is made first to FIGURE 3 which shows the operating characteristics of electromagnetic clutch 38.

Inasmuch as slippage occurs between the input and output members of the clutch until excitation is sufficient to lock them at the same speed, heat is generated. The amount of heat generated varies in direct proportion to the difference between input and output speed and the amount of heating which can be tolerated depends on the rate at which it can be dissipated and constitutes a limiting factor on torque-transmission. Permissible heating is graphically shown by curve A of FIGURE 3.

From curve A, the heat-limited permissible torque curve, B can be derived. Curve B shows the amount of torque which can be transmitted by the clutch without exceeding the limit imposed by the characteristic heat dissipation rate of the unit, i.e., without overheating. From curve B it will be understood that as the speed difference between the input and output member decreases and less heat is generated, more torque can be transmitted. In comparison, curve C shows the rate at which the transmitted torque increases if a constant excitation is applied to the clutch such that the permissible heating will not be exceeded at the higher speed differences. From curve C it will be seen that the torque transmitted increases by a factor of approximately 2 to 1 as the output member picks up speed, i.e., as the speed difference decreases. As will be seen as this description proceeds, the power supply system contemplated by the present invention applies constant excitation to the clutch until the flywheel reaches a predetermined speed and then automatically increases excitation until the clutch locks.

Figure 4:
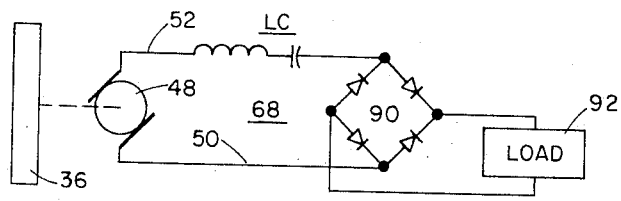
FIGURE 4 is a generalized schematic circuit diagram of a portion of the electromagnetic clutch control circuit contemplated by the present invention.
Figure 5:
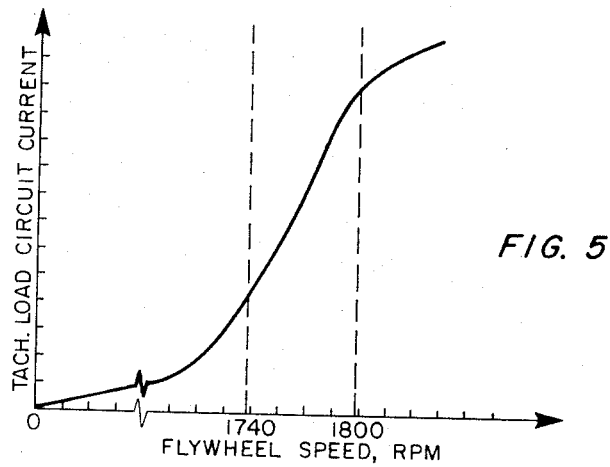
FIGURE 5 is a graphic representation of the variation of current in the load circuit of FIGURE 4 with flywheel speed.

Referring now to FIGURE 4 there is shown a generalized form of the flywheel-speed-sensing arrangement utilized in the FIGURE 2 power supply system. For convenience, the frequency of tachometer generator 48 should be selected to produce a relatively high frequency ripple content in the output. Thus, for example, with a motor-generator set operating at a synchronous speed 1800 revolutions per minute, a tachometer generator having a frequency of 180 cycles per second at this speed may be used to advantage. The resonant frequency of the series resonant circuit LC should be selected to be slightly higher, e.g., 183 cycles per second. The output characteristic of the tachometer generator and resonant circuit versus speed of the flywheel is shown in FIGURE 5.

Figure 6:
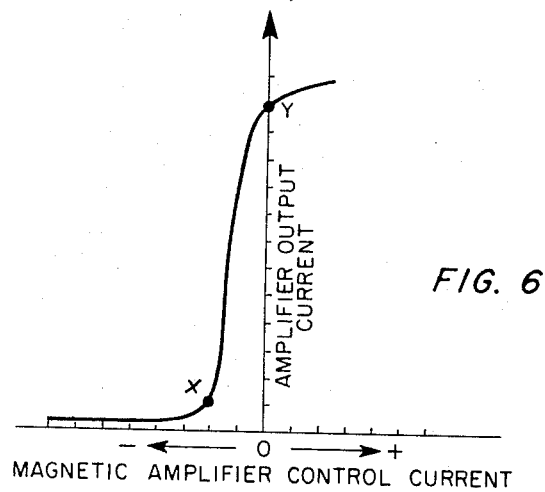
FIGURE 6 is a graphic representation of the variation of control current in a magnetic amplifier utilized in the control circuit of the electromagnetic clutch.

The rectified output of the resonant circuit feeds the control circuit 68 of the magnetic amplifier which has a characteristic shown in FIGURE 6. It will be seen that with zero control current the output of the amplifier is close to a maximum. A bias current is provided and adjusted by means of resistor 82, FIGURE 2, to set the operating level to point X when there is no current in the control winding 92. When there is neither control nor bias current, the output level is at point Y. By reference to FIGURE 2 it will be seen that the bridge rectifier network 76 supplies fixed excitation to clutch coil 40; the magnetic amplifier furnishes excitation which is a function of flywheel speed.

The operating sequence of the system is as follows: To start the motor-generator set, start button $S_1$ is closed completing a circuit to the operating coil of relay $R_{S0}$ closing normally-open contacts $R_{S1}$, $R_{S2}$ and $R_{S3}$ thus supplying power to the drive motor. At the same time operating coil 110 of the time delay relay $R_{TD0}$ is energized closing normally-open switch $T_{DR1}$ which maintains a completed circuit across the start button $S_1$ after the button is released. The energization of the $T_{DR0}$ also opens normally-closed contact $T_{DR2}$ so that computer cycling circuits 58 are maintained de-energized.

During acceleration drive motor 12 draws a relatively high line current which is coupled via transformer $T_3$ to the operating circuit of relay $R_{C0}$ energizing the relay coil which in turn opens normally-closed contact $R_{C2}$ which is in series with clutch coil 40. Consequently, clutch 38 is totally de-energized so that the motor-generator set is permitted to accelerate without the flywheel load. At the same time contact $R_{C1}$ is closed shunting the secondary of transformer $T_2$ so as to lock out the current-limiting circuit of the magnetic amplifier during initial acceleration of the motor-generator set.

When the set 10 is up to speed generator voltage regulator 24 builds up the current through field windings 22 in response to, and thus controls, the output voltage of the generator. When the rated output voltage is reached, the set is ready to deliver power to the load, i.e., the computer 34.

As the motor-generator set attains its operating speed, the reduction in line current drawn by the drive motor causes relay $R_{C0}$ to drop out; as a result relay contact $R_{C2}$ closes completing the circuit to clutch coil 40 and $R_{C1}$ opens to activate current-limiting control circuit 70. At this stage clutch coil 40 is energized almost entirely by current from the output of bridge network 76 regulated to the desired value by the adjustable resistor 78 in series therewith. As tachometer generator 48 is not yet operating at the resonant speed of series resonant circuit LC, the impedance of LC is high, causing low control current in control coil 92 of the magnetic amplifier and, therefore, low output from the amplifier.

In the event that the energization of clutch coil 40 should become too high while part of its supply is being derived from the output of the magnetic amplifier, the increase in line current drawn by motor 12 would be refletced in an increase output from bridge rectifier network 94 and when the potential on Zener diode 98 exceeds its breakdown value, it becomes conductive causing a surge of current in the current-limiting coil of the magnetic amplifier reducing its output.

When the flywheel is up to operating speed, the output of tachometer generator 48 coincides with the resonant frequency of series resonant circuit LC producing a maximum control current flow in the control winding 92 of the magnetic amplifier. This causes maximum output and therefore maximum excitation of clutch coil 40 causing the clutch to lock.

In the event that there is a momentary interruption of the supply voltage to drive motor 12, relay $R_{S0}$ drops out but continuity of the starting circuit is maintained by closed contact $R_{TD1}$ of time delay relay $R_{TD0}$ for the particular duration, e.g., one second or so, for which the time delay relay is set. Should power be restored before the end of the time delay, relay $R_{S0}$ will be pulled in once again and close the power supply circuit to the motor. It should be noted that, due to the normally-open contact $R_{SB}$ of contactor $R_{S0}$ in series with bias circuit 66 of the magnetic amplifier, the bias circuit is opened when the contactor drops out thus causing maximum excitation to the clutch coil locking the clutch.

When power is restored before relay $R_{TD0}$ drops out, drive motor 12 will accelerate back to synchronous speed causing a high armature current surge in lines 18 which pulls in relay $R_{C0}$ opening contact $R_{C2}$; thus the clutch coil circuit is opened releasing the load of the flywheel while the motor is resynchronizing. When the motor is back to speed, armature current falls once again causing relay $R_{C0}$ to drop out. Concomitantly, contact $R_{C2}$ closes, once again completing the clutch coil circuit so that the flywheel is brought back to operating speed in the same manner as in a start from a standstill.

Should the power interruption endure beyond its setting, time delay relay $R_{TD0}$ drops out causing the motor-generator set to shut down. With the dropping out of $R_{TD0}$, contact $R_{TD2}$ closes energizing the computer cycling-down circuitry. Also, as previously mentioned, clutch 38 is locked because contactor $R_{S0}$ is dropped out and contact $R_{SB}$ opened to remove bias from the magnetic amplifier. The generator loses speed gradually but, inasmuch as the generator voltage regulator is frequency independent, the generator output voltage is maintained until the system runs out of range. As the rate of speed decay is determined by the load on the motor-generator set and the mass of the flywheel, the system can be designed to provide sufficient power to permit normal cycling down of a computer load.

While there has been described what at present is believed to be the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. In combination with a power supply system including a motor-generator set, a flywheel, and an electromagnetic clutch having an excitation circuit and a torque-transmission capability proportional to applied excitation, a control circuit for regulating the excitation of said clutch, comprising:
   means, operative to totally-de-energize said clutch at rotational speeds of the motor-generator set below normal operating speed;
   means, operative upon the attainment of operating speed by said motor-generator set, to supply a fixed excitation to said clutch sufficient to produce gradual acceleration of the flywheel at a pre-selected rate up to a predetermined speed below said normal operating speed; and
   means, effective upon the attainment of said predetermined speed to progressively increase the excitation of said clutch in accordance with increasing flywheel speed until locking of the clutch occurs.

2. The combination defined in claim 1, wherein said last-named means includes:
   an A.-C. tachometer generator drivingly coupled to said flywheel and having an output circuit electrically coupled to the excitation circiut of said clutch; and
   frequency-dependent impedance means in said tachometer output circuit having an impedance which varies inversely with frequency.

3. The combination defined in claim 2 including means, disabled upon interruption of power supply to said motor, normally operative to oppose excitation of said clutch.

4. The combination defined in claim 3 including means, operative when said motor-generator set has reached operating speed, limiting the excitation of said clutch and, concomitantly, the rate of acceleration of said flywheel, in accordance with a predetermined maximum value of armature current drawn by said motor.

5. In combination with a power supply system including a motor-generator set, a flywheel, and an electromagnetic clutch having an excitation circuit and a torque-transmission capability proportional to applied excitation, a control circuit for regulating the excitation of said clutch, comprising:
   means, operative to totally de-energize said clutch at rotational speeds of the motor generator set below normal operating speed;
   means, operative upon the attainment of operating speed by said motor-generator set, to supply a fixed excitation to said clutch sufficient to produce gradual acceleration of the flywheel at a pre-selected rate up to a predetermined speed below said normal operating speed; and
   means, effective upon the attainment of said predetermined speed to progressively increase the excitation of said clutch in accordance with increasing flywheel speed until locking of the clutch occurs, said excitation increasing means including
      an A.-C. tachometer generator drivingly coupled to said flywheel and having an output circuit electrically coupled to the excitation circuit of said clutch; and
      frequency-dependent impedance means in said tachometer output circuit having an impedance which varies inversely with frequency and has a minimum value of impedance at substantially the operating speed of the motor-generator set.

6. A power supply system comprising:
   a generator having a field winding;
   a motor drivingly coupled to said generator and having power supply input connections;
   a flywheel;
   an electromagnetic clutch having a control coil energizable to increase the torque-transmission capability of the clutch in direct proportion to the applied excitation;
   means, operative upon the attainment of normal operating speed by said motor-generator set, to supply a fixed excitation to said clutch control coil to produce gradual acceleration of the flywheel, at a pre-selected rate, up to a predetermined speed below said normal operating speed;
   a magnetic amplifier including a control circuit and an amplification circuit having its output connected across said clutch control coil;
   an A.-C. tachometer generator drivingly connected to said flywheel and having an output circuit;
   a rectifier network having an input connected across the output circuit of said tachometer generator and an output connected across the control circuit of said magnetic amplifier;
   a series resonant inductor-capacitor combination in the output circuit of said tachometer generator, the resonant frequency of said combination corresponding substantially to the output frequency of the tachometer generator at the operating speed of said synchronous motor; and
   means, operative in response to acceleration of said motor-generator set, to open-circuit said clutch control coil.

7. A power supply system comprising:
   an A.-C. generator having a field winding;
   a synchronous motor drivingly coupled to said generator and having power supply input connections;
   a flywheel;
   an electromagnetic clutch having a control coil energizable to increase the torque-transmission capability of the clutch in direct proportion to the applied excitation;
   a magnetic amplifier including a bias circuit, a control circuit and an amplification circuit having its output connected across said clutch control coil;
   a power transformer having a primary winding, coupled to the output of said generator, and a pair of secondary windings, one of which is coupled to the input of said amplification circuit;
   a rectifier network having an input connected across the other secondary winding of the power transformer and an output connected across the bias circuit of said amplifier and across said clutch control coil;
   an A.-C. tachometer generator drivingly connected to said flywheel and having an output circuit;
   a second rectifier network having an input connected across the output circuit of said tachometer generator and an output connected across the control circuit of said magnetic amplifier;
   a series resonant inductor-capacitor combination in the output circuit of said tachometer generator, the resonant frequency of said combination corresponding substantially to the output frequency of the tachometer generator at the operating speed of said synchronous motor;
   a relay having its operating circuit coupled in series with the power supply input of the motor and normally-closed contacts in series with the clutch coil; and
   a second relay having its operating circuit shunting the power supply input of said motor and normally-open contacts connected in series with the bias circuit of said magnetic amplifier.

8. A power supply system comprising:
an A.-C. generator having a field winding;
a synchronous motor drivingly coupled to said generator and having power supply input connections;
a flywheel;
an electromagnetic clutch having a control coil energizable to increase the torque-transmission capability of the clutch in direct proportion to the applied excitation;
a magnetic amplifier including a bias circuit, a control circuit and an amplification circuit having its output connected across said clutch control coil;
a power transformer having a primary winding, coupled to the output of said generator, and a pair of secondary windings, one of which is coupled to the input of said amplification circuit;
a rectifier network having an input connected across the other secondary winding of the power transformer and an output connected across the bias circuit of said amplifier and across said clutch control coil;
an A.-C. tachometer generator drivingly connected to said flywheel and having an output circuit;
a second rectifier network having an input connected across the output circuit of said tachometer generator and an output connected across the control circuit of said magnetic amplifier;
a series resonant inductor-capacitor combination in the output circuit of said tachometer generator, the resonant frequency of said combination corresponding substantially to the output frequency of the tachometer generator at the operating speed of said synchronous motor;
a relay having its operating circuit coupled in series with the power supply input of the motor and normally-closed contacts in series with the clutch coil;
a second relay having its operating circuit shunting the power supply input of said motor;
a normally-open starting switch and a normally-closed stopping switch in series in said second relay operating circuit;
a fast pickup, time-delayed-dropout relay having its operating circuit in parallel with the operating circuit of said second relay;
respective, normally-open contacts on the second relay and time-delayed relay connected in parallel across the contacts of said starting switch; and
normally-open contacts on said second relay connected in series with the bias circuit of said magnetic amplifier.

9. In combination with an electronic computer having a cycling-down circuit, a power supply system comprising:
an A.-C. generator having a field winding;
an automatic voltage regulator connected between said field winding and the output of said generator to maintain a constant output voltage;
a synchronous motor drivingly coupled to said generator and having power supply input connections;
a flywheel;
an electromagnetic clutch having a control coil energizable to increase the torque-transmission capability of the clutch in direct proportion to the applied excitation;
a magnetic amplifier including a bias circuit, a control circuit and an amplification circuit having its output connected across said clutch control coil;
a power transformer having a primary winding, coupled to the output of said generator, and a pair of secondary windings, one of which is coupled to the input of said amplification circuit;
a bridge-type rectifier network having an input connected across the other secondary winding of the power transformer and an output connected across the bias circuit of said amplifier and across said clutch control coil;
an A.-C. tachometer generator drivingly connected to said flywheel and having an output circuit;
a second bridge-type rectifier network having an input connected across the output circuit of said tachometer generator and an output connected across the control circuit of said magnetic amplifier;
a series resonant inductor-capacitor combination in the output circuit of said tachometer generator, the resonant frequency of said combination corresponding substantially to the output frequency of the tachometer generator at the operating speed of said synchronous motor;
a limiting circuit for the armature current of said motor, including a third bridge-type rectifier network having an input circuit inductively coupled to the power supply input of the motor and an output inductively coupled to said magnetic amplifier in opposing relation to the power amplification circuit, said bridge output circuit containing shunt and series impedances, the series impedance including a Zener diode;
a relay having its operating cricuit inductively coupled in series with the power supply input of the motor, normally-closed contacts in series with the clutch coil, and normally-open contacts shunting the input circuit of said third bridge-type rectifier network;
a second relay having its operating circuit shunting the power supply input of said motor;
a normally-open starting switch and a normally-closed stopping switch in series in said second relay operating circuit;
a fast pickup, time-delayed-dropout relay having its operating circuit in parallel with the operating circuit of said second relay;
respective, normally-open contacts on the second relay and time-delayed relay connected in parallel across the contacts of said starting switch; and
normally-open contacts on said second relay connected in series with the bias circuit of said magnetic amplifier.

References Cited by the Examiner

UNITED STATES PATENTS

| | | | |
|---|---|---|---|
| 2,981,846 | 4/1961 | Maurice | 322—15 X |
| 3,088,063 | 4/1963 | Fehn | 138—161 |
| 3,196,341 | 7/1965 | Gerb | 322—4 |
| 3,252,022 | 5/1966 | Smith | 310—95 |

MILTON O. HIRSHFIELD, *Primary Examiner.*

J. J. SWARTZ, *Assistant Examiner.*